(12) United States Patent
Chen et al.

(10) Patent No.: US 12,072,522 B2
(45) Date of Patent: Aug. 27, 2024

(54) DISPLAY DEVICE

(71) Applicant: Coretronic Corporation, Hsin-Chu (TW)

(72) Inventors: Ping-Yen Chen, Hsin-Chu (TW); Chung-Yang Fang, Hsin-Chu (TW); Jen-Wei Yu, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 4 days.

(21) Appl. No.: 17/573,635

(22) Filed: Jan. 12, 2022

(65) Prior Publication Data

US 2022/0244598 A1     Aug. 4, 2022

(30) Foreign Application Priority Data

Feb. 1, 2021   (CN) .......................... 202110136639.2

(51) Int. Cl.
    *G02F 1/1335*     (2006.01)
    *F21V 8/00*     (2006.01)
    *G02F 1/13363*     (2006.01)

(52) U.S. Cl.
    CPC .......... *G02B 6/0055* (2013.01); *G02B 6/0053* (2013.01); *G02F 1/133531* (2021.01); *G02F 1/133536* (2013.01); *G02F 1/13363* (2013.01)

(58) Field of Classification Search
CPC ......... G02F 1/133606; G02F 1/133607; G02F 1/13363
See application file for complete search history.

(56) References Cited

U.S. PATENT DOCUMENTS

| 4,690,511 A | * | 9/1987 | Watanabe ......... G02F 1/133514 |
| | | | 349/158 |
| 2008/0043180 A1 | * | 2/2008 | Hagiwara .............. G02B 5/201 |
| | | | 349/106 |

(Continued)

FOREIGN PATENT DOCUMENTS

| CN | 1515939 | 7/2004 |
| CN | 1790135 | 6/2006 |

(Continued)

OTHER PUBLICATIONS

"Office Action of China Counterpart Application", issued on Mar. 4, 2024, pp. 1-12.

*Primary Examiner* — Alexander P Gross
(74) *Attorney, Agent, or Firm* — JCIPRNET

(57) ABSTRACT

The invention provides a display device including a display panel and a backlight module including a light guide plate, a light source, and an optical film. The light guide plate has light incident and exit surfaces. The light source is disposed at one side of the light incident surface. The optical film is overlapped with the light exit surface, and has first optical microstructures facing the light exit surface. The display panel includes a liquid crystal cell overlapped with the light exit surface, first and second polarizers respectively disposed at two opposite sides of the liquid crystal cell, and a phase retardation film disposed between the first and second polarizers. The first polarizer is located between the liquid crystal cell and the optical film. An axial direction of an optical axis of the phase retardation film is perpendicular to an axial direction of an absorption axis of the first polarizer.

16 Claims, 14 Drawing Sheets

(56) References Cited

U.S. PATENT DOCUMENTS

| | | | |
|---|---|---|---|
| 2009/0153774 A1 | 6/2009 | Wu et al. | |
| 2014/0185273 A1* | 7/2014 | Tsai | G02B 5/045 |
| | | | 362/97.1 |
| 2015/0346532 A1* | 12/2015 | Do | G02F 1/133528 |
| | | | 349/96 |
| 2016/0091750 A1 | 3/2016 | Lien et al. | |
| 2017/0343715 A1* | 11/2017 | Fang | G02B 27/28 |
| 2018/0210243 A1* | 7/2018 | Fang | G02F 1/137 |
| 2018/0364412 A1 | 12/2018 | Yao | |
| 2019/0293974 A1 | 9/2019 | Chen et al. | |
| 2020/0110304 A1 | 4/2020 | Lee et al. | |
| 2020/0133070 A1 | 4/2020 | Chen et al. | |
| 2020/0379159 A1 | 12/2020 | Li et al. | |
| 2020/0379162 A1 | 12/2020 | Chen et al. | |
| 2021/0325597 A1* | 10/2021 | Wang | G02B 6/0055 |
| 2023/0037017 A1* | 2/2023 | Yamada | H10K 59/00 |

FOREIGN PATENT DOCUMENTS

| | | |
|---|---|---|
| CN | 201145795 | 11/2008 |
| CN | 101551567 | 10/2009 |
| CN | 101614905 | 12/2009 |
| CN | 102129095 | 7/2011 |
| CN | 103207478 | 7/2013 |
| CN | 107422409 | 12/2017 |
| CN | 108205216 | 6/2018 |
| CN | 108345139 | 7/2018 |
| CN | 110554534 | 12/2019 |
| CN | 111505858 | 8/2020 |
| CN | 111897158 | 11/2020 |
| CN | 211979376 | 11/2020 |
| CN | 112015000 | 12/2020 |
| KR | 20150137367 | 12/2015 |
| TW | 200725052 | 7/2007 |
| TW | 200844602 | 11/2008 |
| TW | 201113596 | 4/2011 |
| TW | I472844 | 2/2015 |
| TW | I589966 | 7/2017 |
| TW | I699596 | 7/2020 |

* cited by examiner

DISPLAY DEVICE

CROSS-REFERENCE TO RELATED APPLICATION

This application claims the priority benefit of China application serial no. 202110136639.2, filed on Feb. 1, 2021. The entirety of the above-mentioned patent application is hereby incorporated by reference herein and made a part of this specification.

BACKGROUND OF THE INVENTION

Field of the Invention

The invention relates to a display device, and more particularly to a display device with anti-peeping performance.

Description of Related Art

Generally speaking, in order to allow a plurality of viewers to watch together, a display device usually has a wide viewing angle display effect. However, in certain situations or occasions, such as browsing private web pages, confidential information, or entering passwords in public, the wide viewing angle display effect is likely to cause the screen to be seen by others and cause confidential information to leak. In order to achieve anti-peeping effect, the general approach is to place a light control film (LCF) in front of the display panel to filter out large-angle light. However, the aperture ratio of such a light control film is low, resulting in a decrease in the overall brightness of the display panel, and the periodic structure thereof is prone to produce a moiré pattern with the pixel array of the display panel.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a display device having an omnidirectional side viewing angle anti-peeping effect and higher brightness in the viewing angle direction.

In order to achieve one or part or all of the above objects or other objects, an embodiment of the invention provides a display device. The display device includes a backlight module and a display panel. The backlight module includes a light guide plate, a light source, and a first optical film. The light guide plate has a light incident surface and a light exit surface connected to the light incident surface. The light source is disposed at one side of the light incident surface of the light guide plate. The first optical film is overlapped with the light exit surface of the light guide plate, and has a plurality of first optical microstructures facing the light exit surface. The display panel includes a liquid crystal cell, a first polarizer, a second polarizer, and a first phase retardation film. The liquid crystal cell is overlapped with the light exit surface of the light guide plate. The first polarizer and the second polarizer are respectively disposed at two opposite sides of the liquid crystal cell, and the first polarizer is located between the liquid crystal cell and the first optical film. The first phase retardation film is disposed between the first polarizer and the second polarizer. An axial direction of an optical axis of the first phase retardation film is perpendicular to an axial direction of an absorption axis of the first polarizer.

Based on the above, in the display device of an embodiment of the invention, a phase retardation film is provided between the two polarizers of the display panel, and the axial direction of the absorption axis of the polarizer located between the liquid crystal cell and the first optical film is perpendicular to the axial direction of the optical axis of the phase retardation film. Accordingly, the display device may be provided with an anti-peeping effect from an omnidirectional side viewing angle. Moreover, the comprehensive phase retardation film may prevent the display device from generating moiré and effectively improve the light energy utilization rate of the display device in the normal viewing angle range.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to make the above features and advantages of the invention better understood, embodiments are specifically provided below with reference to figures for detailed description as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
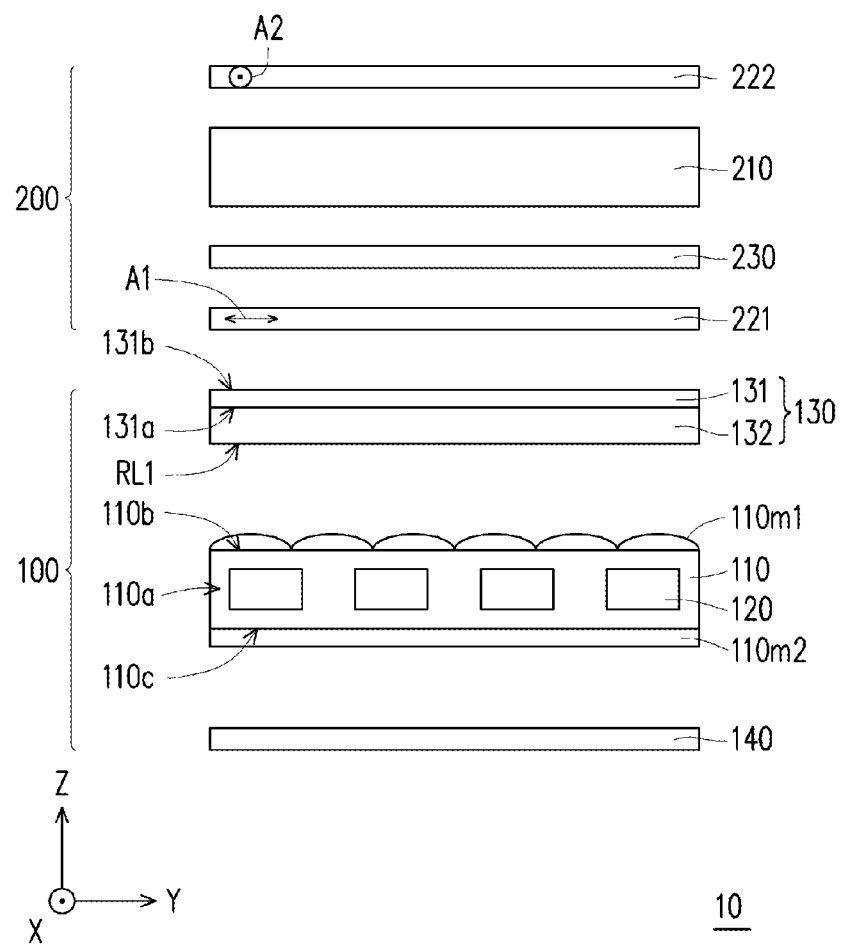
FIG. 1 is a schematic side view of the display device of the first embodiment of the invention.
Figure 2:
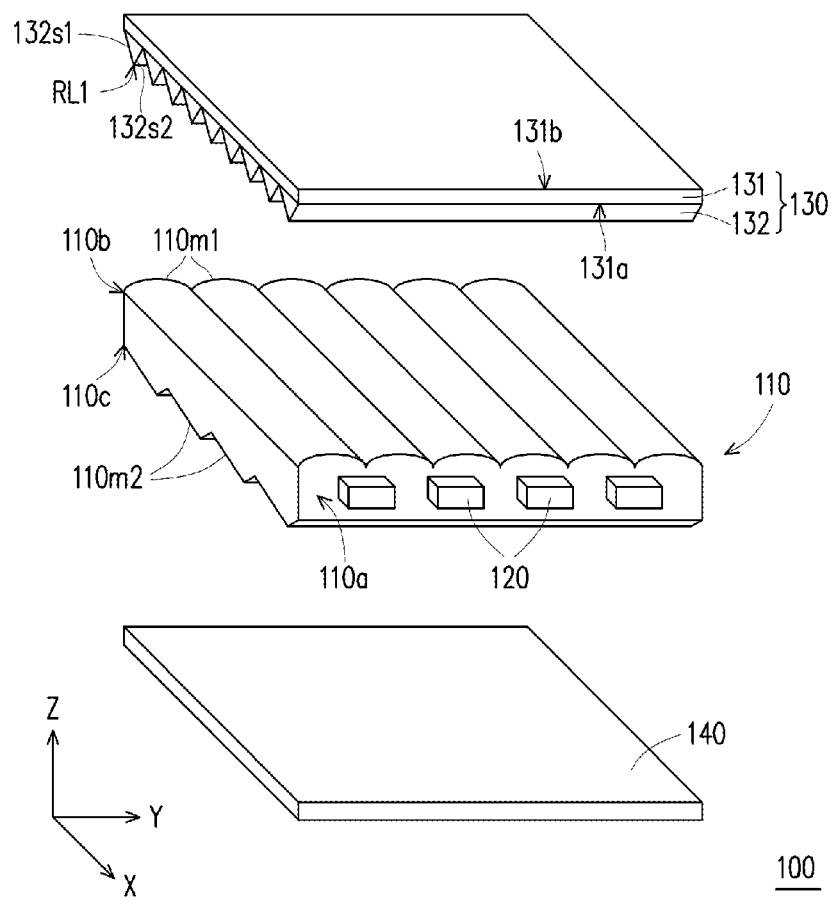
FIG. 2 is a schematic diagram of the backlight module of FIG. 1.
Figure 3:
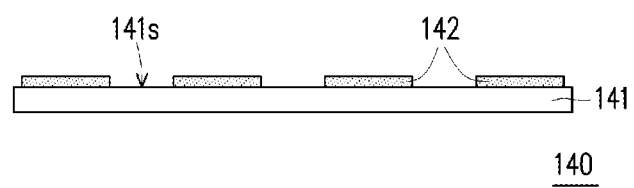
FIG. 3 is a schematic side view of the low-reflectivity reflector of the backlight module of FIG. 1.
Figure 4:
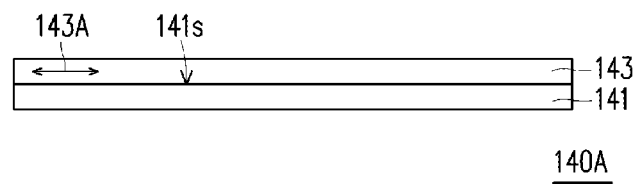
FIG. 4 is a schematic side view of a low-reflectivity reflector of another embodiment of the invention.
Figure 5:
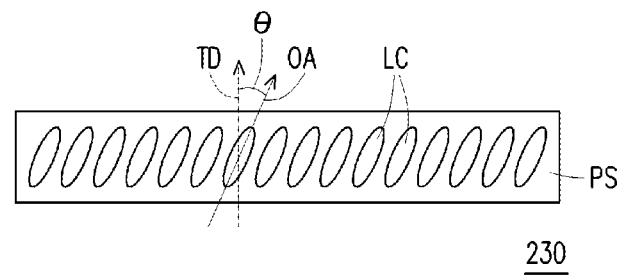
FIG. 5 is a schematic cross-sectional view of the first phase retardation film of FIG. 1.
Figure 6:
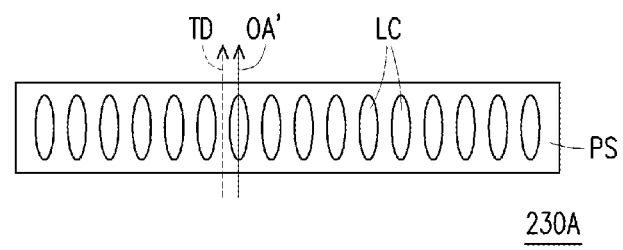
FIG. 6 is a schematic cross-sectional view of a first phase retardation film of another embodiment of the invention.
Figure 7:
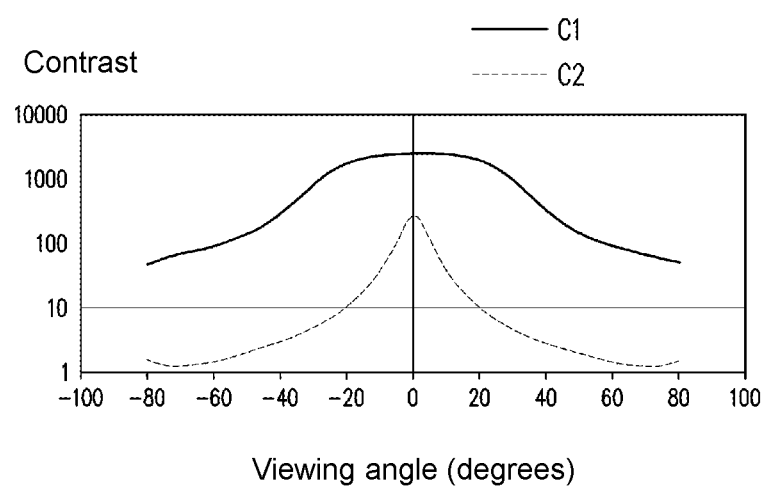
FIG. 7 is a graph of viewing angle versus contrast of the display device in FIG. 1.

FIG. 1 is a schematic side view of the display device of the first embodiment of the invention. FIG. 2 is a schematic diagram of the backlight module of FIG. 1. FIG. 3 is a schematic side view of the low-reflectivity reflector of the backlight module of FIG. 1. FIG. 4 is a schematic side view of a low-reflectivity reflector of another embodiment of the invention. FIG. 5 is a schematic cross-sectional view of the first phase retardation film of FIG. 1. FIG. 6 is a schematic cross-sectional view of a first phase retardation film of another embodiment of the invention. FIG. 7 is a graph of viewing angle versus contrast of the display device in FIG. 1.

Referring to FIG. 1 and FIG. 2, a display device 10 includes a backlight module 100 and a display panel 200 overlapped with each other. The backlight module 100 includes a light guide plate 110, a light source 120, and a first optical film 130. The light guide plate 110 has a light incident surface 110a, a light exit surface 110b connected to the light incident surface 110a, and a bottom surface 110c opposite to the light exit surface 110b. The light source 120 is disposed at one side of the light incident surface 110a of the light guide plate 110. The first optical film 130 is overlapped at one side of the light exit surface 110b of the light guide plate 110. That is, the backlight module 100 of the present embodiment is a side-type backlight module. It should be noted that, in the present embodiment, the number of the light source 120 is exemplarily illustrated by taking four as an example, which does not mean that the invention is limited by the content of the figures. In other embodiments, the number of the light source 120 may be adjusted according to the optical design of the backlight module.

The light guide plate 110 has a plurality of microlens structures 110m1 and a plurality of microlens structures 110m2, and the microlens structures 110m1 and the microlens structures 110m2 are respectively disposed at the light exit surface 110b and the bottom surface 110c of the light guide plate 110, but the invention is not limited thereto. In other embodiments, a plurality of microlens structures may also be provided at only one of the light exit surface and the bottom surface of the light guide plate according to actual light type requirements.

In the present embodiment, the plurality of microlens structures 110m1 of the light guide plate 110 are arranged on the light exit surface 110b along a direction Y, and the extending direction of the microlens structures 110m1 is perpendicular to the light incident surface 110a of the light guide plate 110 (i.e., a direction X). The plurality of microlens structures 110m2 of the light guide plate 110 are arranged on the bottom surface 110c along the direction X, and the extending direction of the microlens structures 110m2 is parallel to the light incident surface 110a of the light guide plate 110 (i.e., the direction Y). In other words, the extending direction of the microlens structures 110m1 may be perpendicular to the extending direction of the microlens structures 110m2. According to other embodiments, the extending direction of the microlens structures 110m1 of the light guide plate 110 may also not be perpendicular to the light incident surface 110a of the light guide plate 110, and is intersected with the extending direction of the microlens structures 110m2, depending on the actual light type requirements.

Moreover, the cross-sectional profile of the microlens structures 110m1 of the light guide plate 110 on a plane (i.e., a YZ plane) perpendicular to the extending direction (for example, the direction X) may have a semi-elliptical shape. That is, the microlens structures 110m1 of the present embodiment may be columnar lens strips. In other embodiments, the cross-sectional profile of the microlens structures 110m1 on a plane perpendicular to the extending direction may also be adjusted according to actual light type requirements (or beam splitting effect). The cross-sectional profile of the microlens structures 110m2 of the light guide plate 110 on a plane (i.e., an XZ plane) perpendicular to the extending direction (for example, the direction Y) may have a wedge shape. That is, the microlens structures 110m2 may be (inclined) triangular lens strips, but the invention is not limited thereto. In other embodiments, the cross-sectional profile of the microlens structures 110m2 on a plane perpendicular to the extending direction may also be adjusted according to actual light type requirements (or beam splitting effect).

It should be mentioned that, the number of microlens structures of the light guide plate 110 of the present embodiment is only for illustrative purposes, and is not intended to limit the invention. In other embodiments, the number of microlens structures of the light guide plate may also be adjusted according to actual design requirements (for example, the configuration relationship of the light source or the size of the light guide plate).

More specifically, the first optical film 130 includes a substrate 131 and a plurality of optical microstructures 132 facing the light exit surface 110b. The substrate 131 has a light incident side 131a and a light exit side 131b opposite to each other, the light incident side 131a faces the light guide plate 110, and the optical microstructures 132 are disposed at the light incident side 131a of the substrate 131. In the present embodiment, the material of the substrate 131 and the optical microstructures 132 may include polyethylene terephthalate (PET), polycarbonate (PC), UV glue, other suitable polymers, or a combination of the above materials.

In the present embodiment, the optical microstructures 132 of the first optical film 130 may be arranged at the substrate 131 along the direction X and extended in the direction Y. In other words, the extending direction of the optical microstructures 132 is parallel to the light incident surface 110a of the light guide plate 110. In addition, the cross-sectional profile of the optical microstructures 132 on a plane (i.e., the XZ plane) perpendicular to the extending direction (i.e., the direction Y) may be triangular. That is, the optical microstructures 132 of the present embodiment may be triangular prism strips, but the invention is not limited thereto. In other embodiments, the cross-sectional profile of the optical microstructures 132 on the XZ plane may also be adjusted according to actual light type requirements (or beam splitting effect). More specifically, each of the optical microstructures 132 has a first inclined surface 132s1 and a second inclined surface 132s2 opposite to each other. The boundary between the first inclined surface 132s1 and the second inclined surface 132s2 defines a ridge line RL1 of the optical microstructures 132, and the ridge line RL1 may be extended in the direction Y.

More specifically, most of the light beam emitted by the light source 120 may be emitted from the light exit surface 110b after being transmitted by the light guide plate 110 and concentrated near the normal viewing angle (for example, the viewing angle range is −15 degrees to 15 degrees). However, during the transmission of multiple reflections and/or refractions of a portion of the light beam in the light guide plate 110, due to small defects on the surface and inside of the light guide plate 110, unpredictable scattering or diffusion occurs, and after the light beam is emitted from the bottom surface 110c, the light beam is reflected to the light exit surface 110b to be emitted and form stray light.

In order to improve the light energy utilization rate of the light source 120 and suppress the generation of the above stray light, the backlight module 100 may also optionally include a low-reflectivity reflector 140 disposed at one side of the bottom surface 110c of the light guide plate 110. Please refer to FIG. 3 at the same time. For example, the low-reflectivity reflector 140 includes a specular reflector 141 and a plurality of light absorption patterns 142. The specular reflector 141 has a reflective surface 141s facing the bottom surface 110c of the light guide plate 110. The light absorption patterns 142 are dispersed on the reflective surface 141s of the specular reflector 141, and are used to absorb unexpected light beams from the bottom surface 110c of the light guide plate 110. Therefore, the influence of the above stray light on the light output type of the backlight module 100 is effectively reduced, and the light collection performance of the backlight module 100 is further improved. In the present embodiment, the specular reflector 141 is, for example, a 3M reflector product ESR (enhanced specular reflector), or a Reiko reflector product 37W01.

However, the invention is not limited thereto, and in another embodiment, the low-reflectivity reflector 140A may also be a combination of the specular reflector 141 and the polarizing film 143 (as shown in FIG. 4), and the polarizing film 143 is disposed on the surface 141s of the specular reflector 141 facing the bottom surface 110c of the light guide plate 110 (that is, the polarizing film 143 is located between the specular reflector 141 and the light guide plate 110), wherein the axial direction of an absorption axis 143A of the polarizing film 143 is parallel to the axial direction of the absorption axis of the polarizer at one side of the display panel 200 adjacent to the backlight module 100 (for example, an absorption axis A1 of a first polarizer 221 of FIG. 1).

In yet another embodiment, the low-reflectivity reflector 140 of the backlight module 100 may also be replaced by a light absorption sheet (not shown). For example, the unexpected light beams emitted from the bottom surface 110c may be effectively absorbed by the light absorption sheet having the absorption rate of the visible light waveband higher than 70%. Although the maximum light output brightness of the light guide plate 110 may be affected, the influence of such stray light on the light output type of the backlight module may be effectively reduced, thus further improving the light collection of the backlight module. In a preferred embodiment, the absorption rate of the light absorption sheet in the visible light waveband may be optionally higher than 90%.

More specifically, the display panel 200 includes a liquid crystal cell 210, a first polarizer 221, a second polarizer 222, and a first phase retardation film 230. The liquid crystal cell 210 is overlapped with the light exit surface 110b of the light guide plate 110. The first polarizer 221 and the second polarizer 222 are respectively disposed at two opposite sides of the liquid crystal cell 210, and the first polarizer is located between the liquid crystal cell 210 and the first optical film 130. The first phase retardation film 230 is disposed between the first polarizer 221 and the second polarizer 222. For example, in the present embodiment, the first phase retardation film 230 may be optionally located between the liquid crystal cell 210 and the first polarizer 221, but the invention is not limited thereto. In other embodiments, the first phase retardation film 230 may also be disposed between the liquid crystal cell 210 and the second polarizer 222.

For example, the first phase retardation film 230 may be a liquid crystal polymer film. The liquid crystal polymer film includes a polymer substrate PS and a plurality of liquid crystal molecules LC dispersed in the polymer substrate PS, and the arrangement direction of the liquid crystal molecules LC may define the axial direction of an optical axis OA of the first phase retardation film 230 (as shown in FIG. 5).

In the present embodiment, the liquid crystal cell 210 is, for example, an in-plane switching (IPS) liquid crystal cell or a vertical alignment (VA) liquid crystal cell. Referring to FIG. 5 at the same time, correspondingly, an average included angle θ between the axial direction of the optical axis OA of the first phase retardation film 230 and a thickness direction TD of the first phase retardation film 230 may be between 30 degrees and 75 degrees, and the in-plane retardation value (Re) thereof may be between 100 nm and 300 nm. In other words, the first phase retardation film 230 of the present embodiment is an O-plate.

However, the invention is not limited thereto. In other embodiments, the liquid crystal cell 210 may also be a twisted nematic (TN) liquid crystal cell. Correspondingly, the axial direction of an optical axis OA' of a first phase retardation film 230A is parallel to the thickness direction TD of the first phase retardation film 230A (as shown in FIG. 6), and the thickness direction phase retardation value (Rth) thereof may be between −100 nm and −300 nm. That is, when the liquid crystal cell 210 is a TN liquid crystal cell, the first phase retardation film 230A is a positive C-plate.

It should be mentioned that, by making the axial direction of the optical axis OA of the first phase retardation film 230 (or the optical axis OA' of the first phase retardation film 230A) perpendicular to the axial direction of the absorption axis A1 of the first polarizer 221, the display device may have an anti-peeping effect from an omnidirectional side viewing angle. For example, in the present embodiment, the vertical projection of the optical axis OA of the first phase retardation film 230 on the first polarizer 221 is perpendicular to the absorption axis A1 of the first polarizer 221. From another point of view, on the inclined surface (relative to the light exit surface 110b of the light guide plate 110) formed by the optical axis OA of the first phase retardation film 230 and the absorption axis A1 of the first polarizer 221, the axial direction of the optical axis OA of the first phase retardation film 230 is the axial direction perpendicular to the absorption axis A1 of the first polarizer 221.

Referring to FIG. 1 and FIG. 7, a curve C1 shows the numerical change of the contrast of the display device of a comparative example under different viewing angles, and a curve C2 shows the numerical change of the contrast of the display device 10 of the present embodiment under different viewing angles. More specifically, the display device of the comparative example does not have the first phase retardation film 230 of the display device 10. It may be known from FIG. 7 that, by providing the first phase retardation film 230, the contrast value of the display device 10 may be significantly reduced, and in particular the reduction percentage of a large viewing angle is greater than the reduction percentage of a normal viewing angle. For example, under a normal viewing angle, the contrast value is dropped from the original 2000 (that is, the contrast value of the comparative example) to 250, and the reduction percentage reaches 87.5%. With a side viewing angle of 40 degrees, the contrast value is reduced from 250 to 3 or less, and the reduction percentage reaches 98.8%.

In other words, the display device 10 of the present embodiment may significantly reduce the display contrast under the side viewing angle by providing the first phase retardation film 230 to achieve anti-peeping effect. In particular, since the first phase retardation film 230 is a comprehensive film layer and does not have any periodic structure, the display device 10 may have an anti-peeping effect from an omnidirectional side viewing angle and at the same time effectively improve the light energy utilization rate of the display device 10 in the normal viewing angle range. Moreover, the display device 10 using the first phase retardation film 230 to achieve anti-peeping effect does not have a moiré pattern generated between a conventional light control film and the periodic pixel array of the liquid crystal cell 210. Therefore, optical design flexibility may also be increased.

Some other embodiments are provided below to describe the disclosure in detail, wherein the same members are marked with the same reference numerals, and the description of the same technical content is omitted. For the omitted portions, please refer to the above embodiments, which are not repeated herein.

Figure 8:
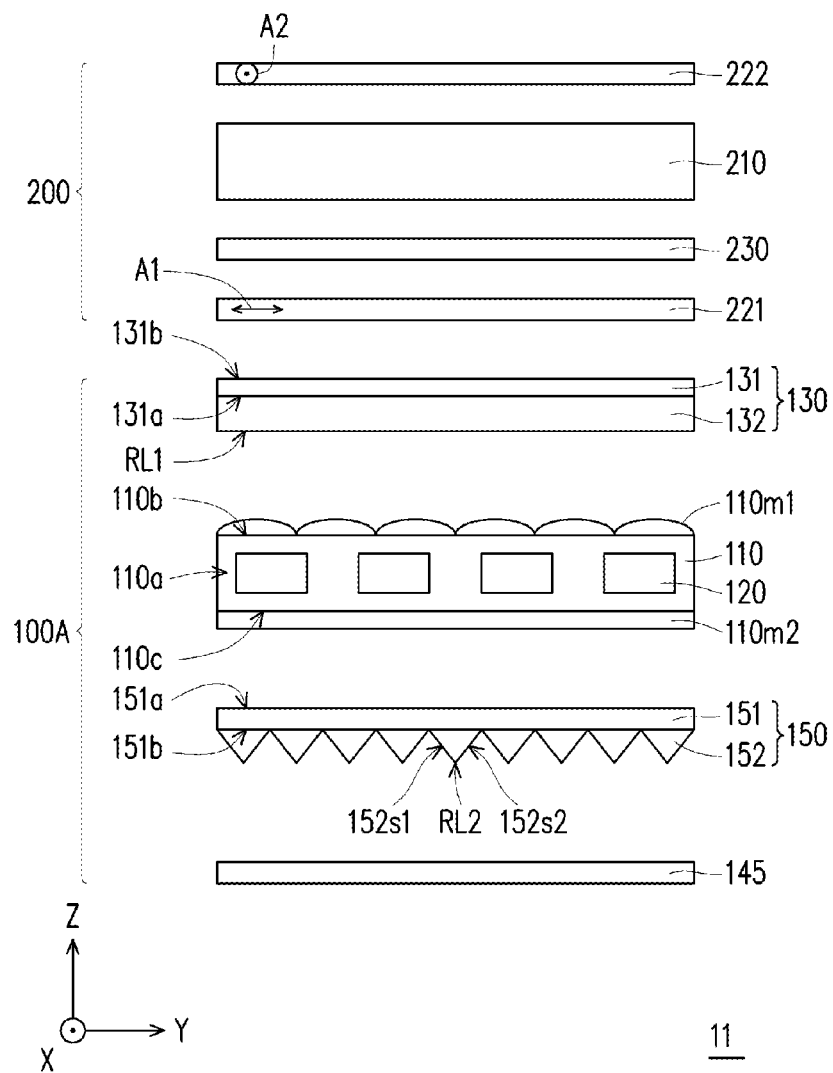
FIG. 8 is a schematic side view of the display device of the second embodiment of the invention.
Figure 9:
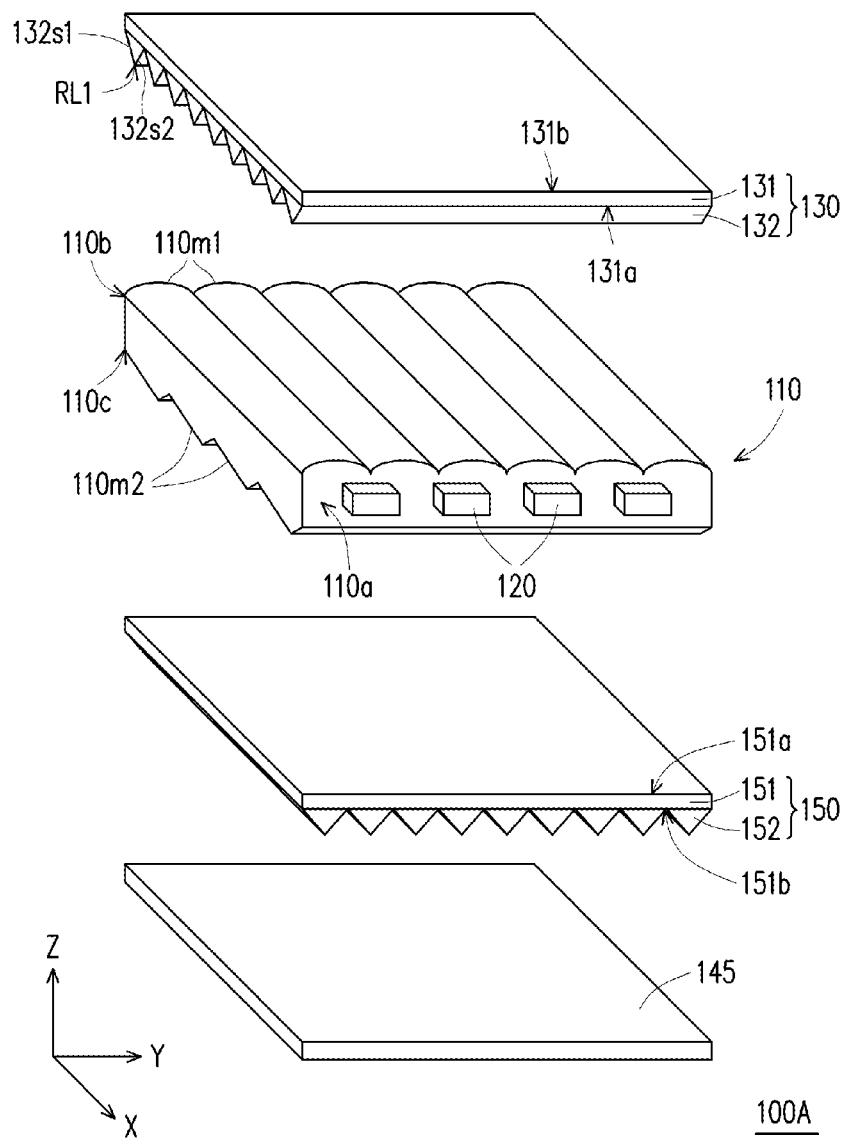
FIG. 9 is a schematic diagram of the backlight module of FIG. 8.
Figure 10:
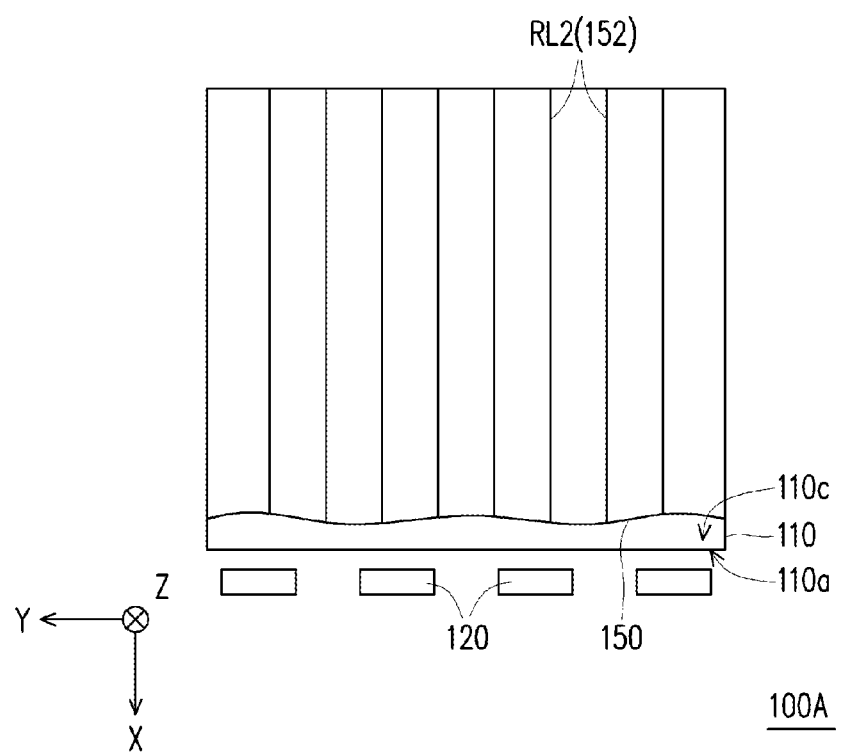
FIG. 10 is a schematic bottom view of the backlight module of FIG. 9.

FIG. 8 is a schematic side view of the display device of the second embodiment of the invention. FIG. 9 is a schematic diagram of the backlight module of FIG. 8. FIG. 10 is a schematic bottom view of the backlight module of FIG. 9.

Figure 11:
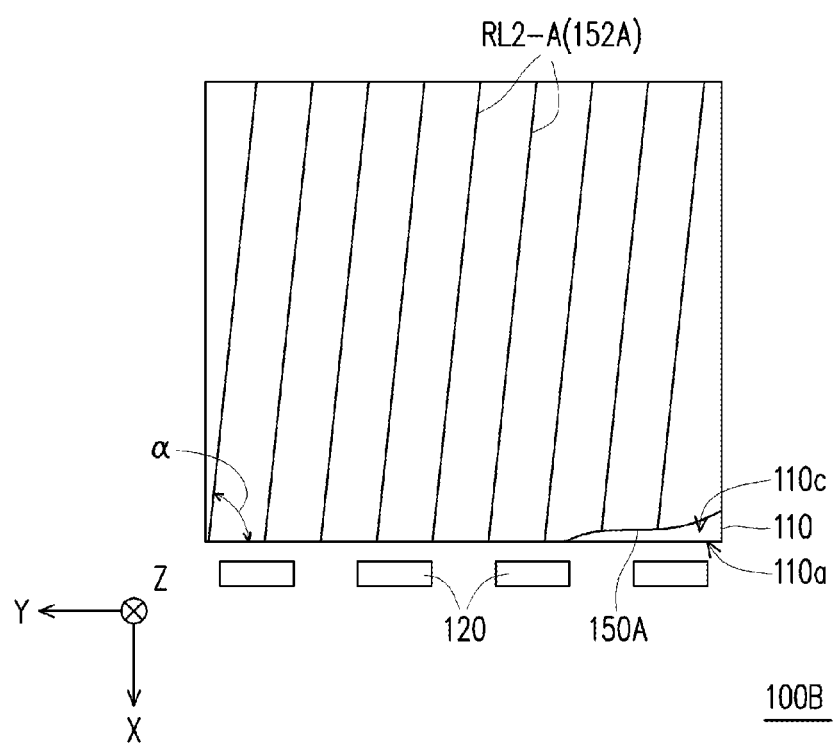
FIG. 11 is a schematic bottom view of a backlight module of another embodiment of the invention.

FIG. 11 is a schematic bottom view of a backlight module of another embodiment of the invention. In particular, for clarity, FIG. 10 only depicts the light guide plate 110, the light source 120, and a ridge line RL2 of optical microstructures 152 of a second optical film 150 of FIG. 9.

Referring to FIG. 8 and FIG. 9, the difference between a display device 11 of the present embodiment and the display device 10 of FIG. 1 is that the composition of the backlight module is different. In order to further increase the total light output of the backlight module near the normal viewing angle (for example, the viewing angle range is −15 degrees to 15 degrees), a backlight module 100A of the display device 11 further includes a second optical film 150, and the backlight module 100A replaces the low-reflectivity reflector 140 of FIG. 1 using a light absorption sheet 145. That is, the second optical film 150 is disposed between the light guide plate 110 and the light absorption sheet 145.

In detail, the second optical film 150 includes a substrate 151 and a plurality of optical microstructures 152 facing the light absorption sheet 145. The substrate 151 has a light incident side 151a and a light exit side 151b opposite to each other, the light exit side 151b faces the light absorption sheet 145, and the optical microstructures 152 are disposed at the light exit side 151b of the substrate 151. In the present embodiment, the material of the substrate 151 and the optical microstructures 152 may include polyethylene terephthalate (PET), polycarbonate (PC), UV glue, other suitable polymers, or a combination of the above materials.

Referring to FIG. 10 at the same time, in the present embodiment, the optical microstructures 152 of the second optical film 150 may be arranged at the light exit side 151b of the substrate 151 along the direction Y, and the extending direction of the optical microstructures 152 may be optionally perpendicular to the light incident surface 110a of the light guide plate 110. More specifically, the extending direction of the optical microstructures 152 of the second optical film 150 is perpendicular to the extending direction of the optical microstructures 132 of the first optical film 130.

However, the invention is not limited thereto, and according to other embodiments, the extending direction of the optical microstructures 152 may also not be perpendicular to the light incident surface 110a of the light guide plate 110 (as shown in FIG. 11), for example: an included angle α between the extending direction of optical microstructures 152A (or a ridge line RL2-A) of a second optical film 150A of a backlight module 100B and the light incident surface 110a of the light guide plate 110 may be between 75 degrees and 105 degrees. Accordingly, the phenomenon of light and dark bands, that is, moiré pattern, generated between the second optical film 150A and the plurality of microlens structures 110m1 of the light guide plate 110 (as shown in FIG. 9) may be effectively suppressed. In other words, the light output uniformity of the backlight module 100B may be improved.

In the present embodiment, each of the optical microstructures 152 has a first inclined surface 152s1 and a second inclined surface 152s2 opposite to each other. The boundary between the first inclined surface 152s1 and the second inclined surface 152s2 defines the ridge line RL2 of the optical microstructures 152, and the ridge line RL2 may be extended in the direction X. In addition, the cross-sectional profile of the optical microstructures 152 on a plane (i.e., the YZ plane) perpendicular to the extending direction (i.e., the direction X) may be triangular. That is, the optical microstructures 152 of the present embodiment may be triangular prism strips, but the invention is not limited thereto. In other embodiments, the cross-sectional profile of the optical microstructures 152 on a plane perpendicular to the extending direction may also be adjusted according to actual light type requirements (or beam splitting effect).

More specifically, when the light hits the optical microstructures 152 of the second optical film 150, if the light traveling direction and the projection of the ridge line RL2 at the light exit surface 110b of the light guide plate 110 are parallel or at a small angle, the light is reflected by the optical microstructures 152 and emitted toward the light exit surface 110b; otherwise, the light penetrates the optical microstructures 152 and is absorbed by the light absorption sheet 145. In this way, the ratio of reflection and penetration of light hitting the optical microstructures 152 may be controlled by designing the cross-sectional profile of the optical microstructures 152 or the direction of the ridge line RL2, thereby improving the light collection of the backlight module 100A. In other words, the anti-peeping performance of the display device 11 may be further improved.

Moreover, in another embodiment, the optical microstructures 152 may also be disposed at the light exit side 151b of the substrate 151. If the optical microstructures 152 face the bottom surface 110c of the light guide plate 110, although anti-peeping performance is still improved, the brightness of the vertical viewing angle is reduced.

It should be understood that the light absorption sheet 145 of the present embodiment may also be replaced with the low-reflectivity reflector 140 of FIG. 1 to improve the light energy utilization rate of the light source 120.

Figure 12:
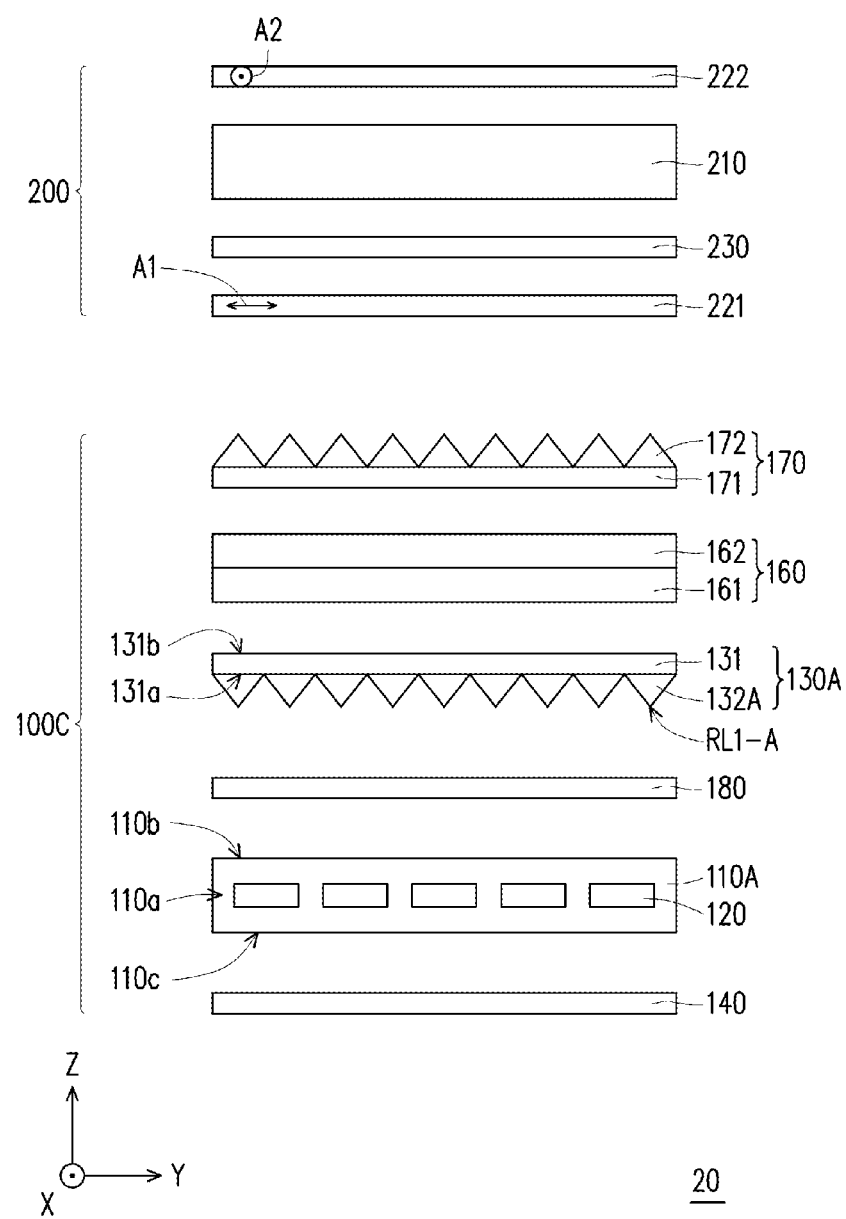
FIG. 12 is a schematic side view of the display device of the third embodiment of the invention.
Figure 13:
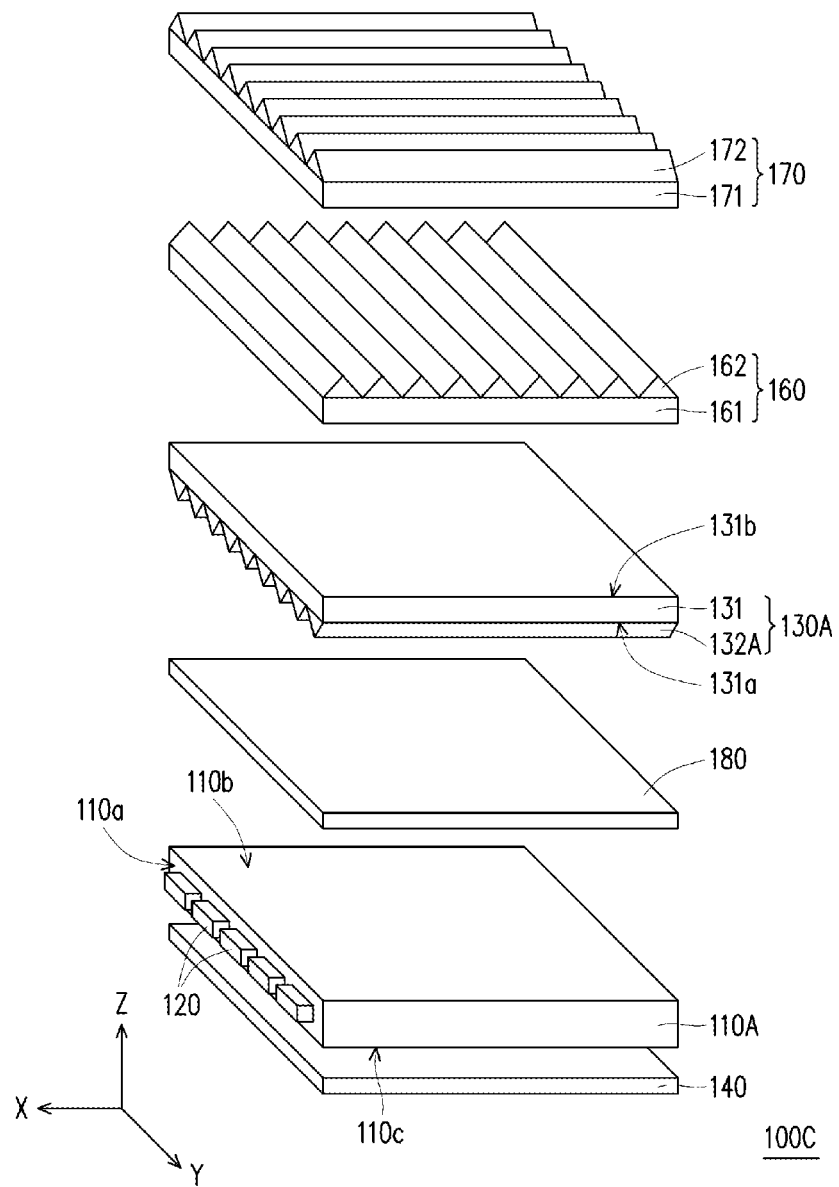
FIG. 13 is a schematic diagram of the backlight module of FIG. 12.
Figure 14:
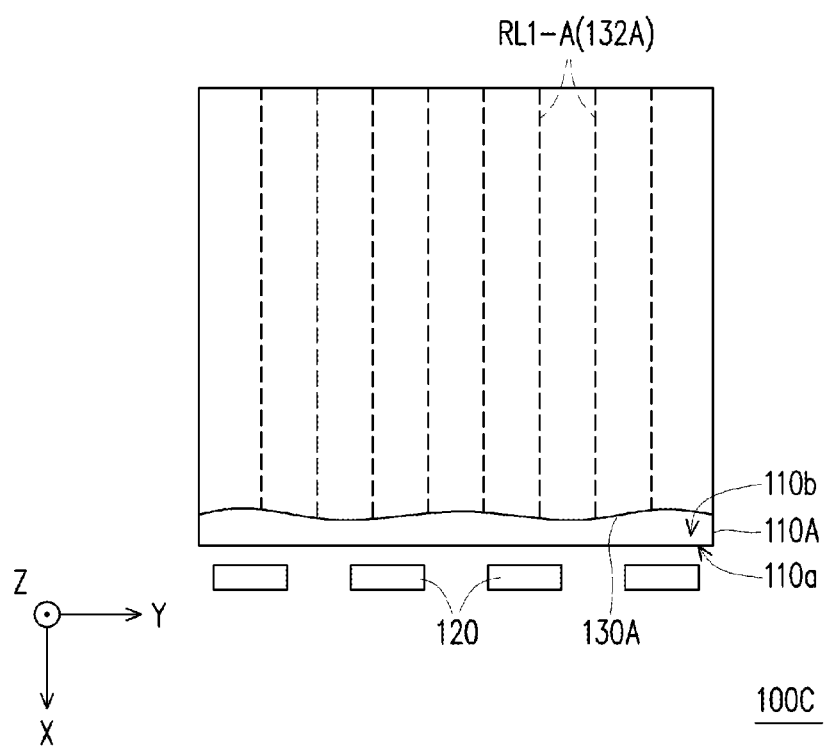
FIG. 14 is a schematic top view of the backlight module of FIG. 13.
Figure 15:
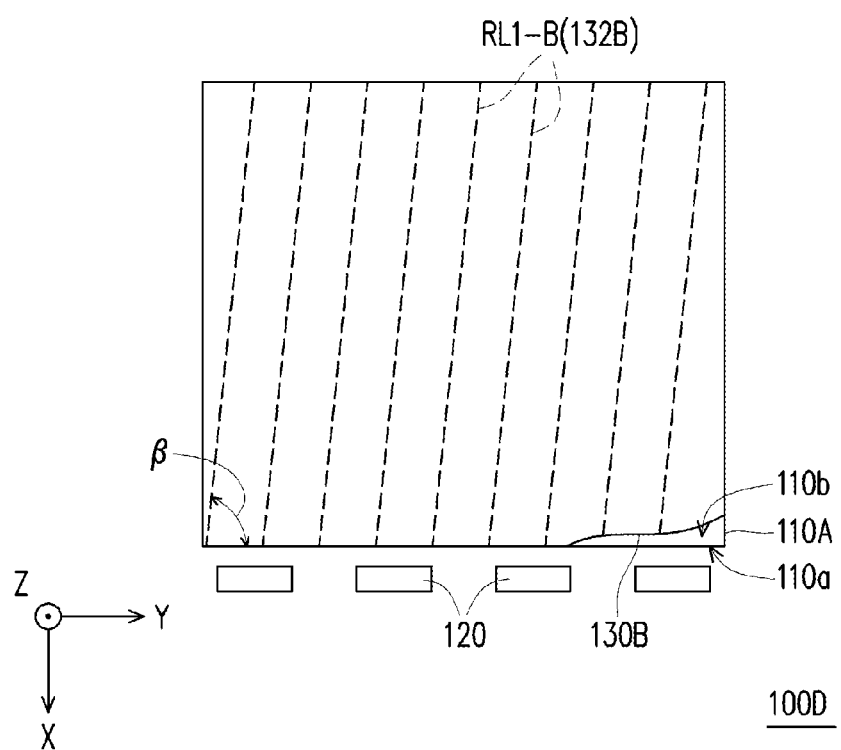
FIG. 15 is a schematic top view of a backlight module of another embodiment of the invention.

FIG. 12 is a schematic side view of the display device of the third embodiment of the invention. FIG. 13 is a schematic diagram of the backlight module of FIG. 12. FIG. 14 is a schematic top view of the backlight module of FIG. 13. FIG. 15 is a schematic top view of a backlight module of another embodiment of the invention. In particular, for clarity, FIG. 14 only depicts a light guide plate 110A, the light source 120, and a ridge line RL1-A of optical microstructures 132A of a first optical film 130A of FIG. 13.

Referring to FIG. 12 and FIG. 13, the difference between a display device 20 of the present embodiment and the display device 10 of FIG. 1 is that the composition of the backlight module is different. Specifically, the light guide plate 110A of a backlight module 100C of the display device 20 does not have the microlens structures 110m1 and the microlens structures 110m2 of the light guide plate 110 of FIG. 1, and further includes a first prism sheet 160, a second prism sheet 170, and a diffusion sheet 180.

The first prism sheet 160 and the second prism sheet 170 are overlapped with the light exit surface 110b of the light guide plate 110A, and are located between the first optical film 130A and the first polarizer 221 of the display panel 200. The first prism sheet 160 is located between the first optical film 130A and the second prism sheet 170. In detail, the first prism sheet 160 has a substrate 161 and a plurality of prism structures 162. The prism structures 162 are arranged along the direction X on the surface of a side of the substrate 161 away from the first optical film 130A, and extended in the direction Y. Similarly, the second prism sheet 170 has a substrate 171 and a plurality of prism structures 172. The prism structures 172 are arranged along the direction Y on the surface of a side of the substrate 171 away from the first prism sheet 160, and extended in the direction X.

In other words, in the present embodiment, the extending direction (i.e., the direction Y) of the plurality of prism structures 162 of the first prism sheet 160 may be perpendicular to the extending direction (i.e., the direction X) of the plurality of prism structures 172 of the second prism sheet 170, but the invention is not limited thereto. In other embodiments, the extending direction of the plurality of prism structures 162 of the first prism sheet 160 may also be not vertical and not parallel to the extending direction of the plurality of prism structures 172 of the second prism sheet 170. That is, the orthographic projection of the extending direction of the plurality of prism structures 162 of the first prism sheet 160 is intersected with the extending direction of the plurality of prism structures 172 of the second prism sheet 170, and the included angle between the extending direction of the plurality of prism structures 162 of the first prism sheet 160 and the extending direction of the plurality of prism structures 172 of the second prism sheet 170 may be greater than 0 degrees and less than 90 degrees.

From another point of view, in the present embodiment, the extending direction of the prism structures 172 of the second prism sheet 170 may be parallel to the extending direction of the optical microstructures 132A of the first optical film 130A, but the invention is not limited thereto. In other embodiments, the included angle between the extending direction of the prism structures 172 of the second prism sheet 170 and the extending direction of the optical microstructures 132A of the first optical film 130A may be between 0 degrees and 30 degrees.

It should be mentioned that, by providing the first prism sheet 160 and the second prism sheet 170 at one side of the first optical film 130A away from the optical microstructures 132A, a portion of the light beam from the first optical film 130A may be totally reflected in the two prism sheets, thus improving the concealability of the backlight module 100C, and therefore improving the assembly yield of the backlight module 100C. In other words, the process latitude of each component of the backlight module 100C may also be increased. Moreover, the diffusion sheet 180 is overlapped with the light exit surface 110b of the light guide plate 110A and located between the light guide plate 110A and the first optical film 130A.

It should be noted that, in the present embodiment, the configuration relationship between the first optical film 130A and the light guide plate 110A is different from the configuration relationship between the first optical film 130 and the light guide plate 110 of FIG. 1. Specifically, the extending direction of the ridge line RL1-A of the optical microstructures 132A of the first optical film 130A may be perpendicular to the light incident surface 110a of the light guide plate 110A. However, the invention is not limited thereto, and according to other embodiments, the extending direction of a ridge line RL1-B of optical microstructures 132B of a first optical film 130B in a backlight module 100D may also not be perpendicular to the light incident surface 110a of the light guide plate 110A. For example, an included angle β between the extending direction of the ridge line RL1-B of the optical microstructures 132B and the light incident surface 110a of the light guide plate 110A may be between 45 degrees and 90 degrees (as shown in FIG. 15). In a preferred embodiment, the included angle β between the extending direction of the ridge line RL1-B of the optical microstructures 132B and the light incident surface 110a of the light guide plate 110A may be between 75 degrees and 90 degrees.

It should be mentioned that, by designing the included angle β between the extending direction of the optical microstructures 132B of the first optical film 130B and the light incident surface 110a of the light guide plate 110B in the range of 45 degrees to 90 degrees, the total light output of the backlight module 100D near the normal viewing angle may be increased, and the total light output of the backlight module 100D near the side viewing angle (for example, 45 degrees) may be reduced. In other words, the light collection of the backlight module 100D and the anti-peeping effect of the display device 20 may be improved.

Figure 16:
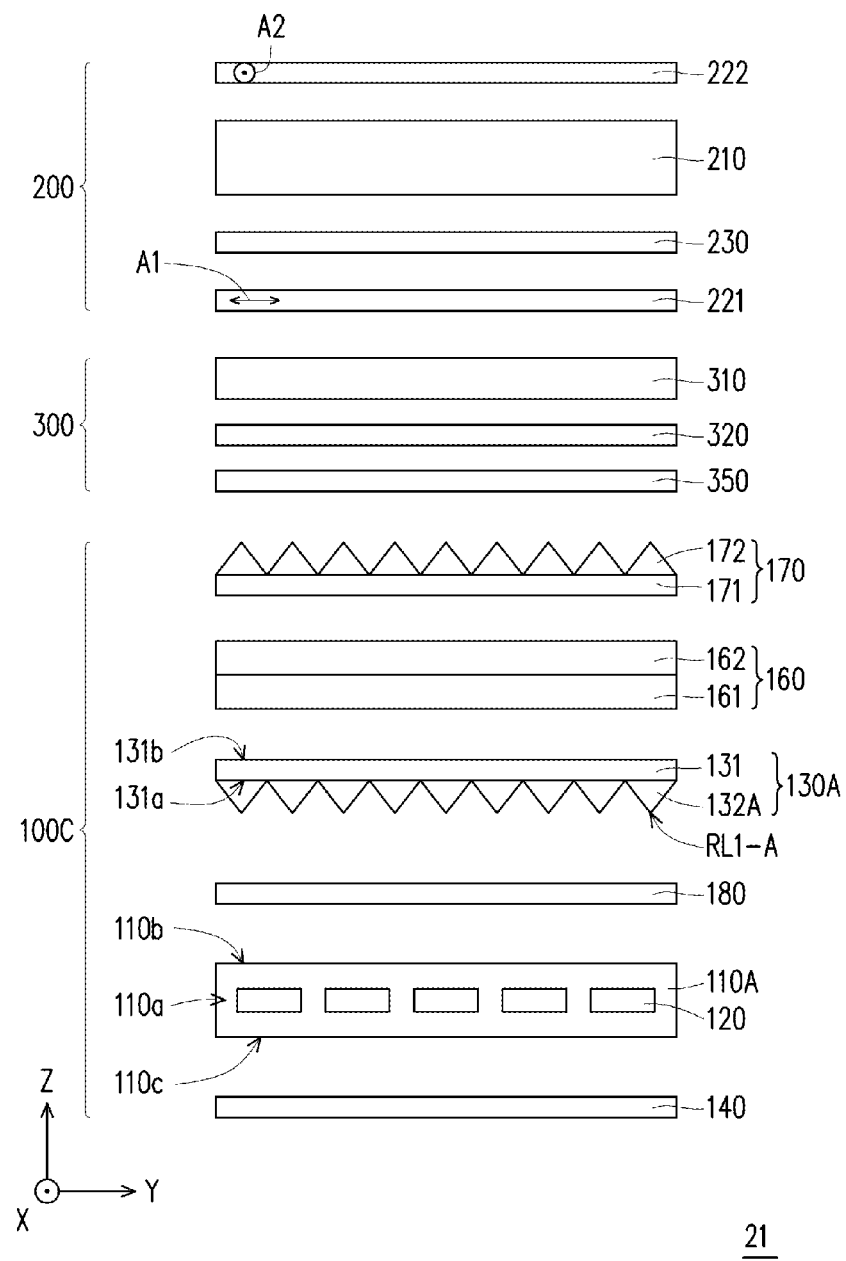
FIG. 16 is a schematic side view of the display device of the fourth embodiment of the invention.

FIG. 16 is a schematic side view of the display device of the fourth embodiment of the invention. Referring to FIG. 16, a display device 21 of the present embodiment and the display device 20 of FIG. 12 are different in that the display device 21 further includes a viewing angle limiting optical film 300 and a reflective polarizer 350 overlapped with the display panel 200 and located between the display panel 200 and the backlight module 100. The reflective polarizer 350 is located between the viewing angle limiting optical film 300 and the backlight module 100C.

By providing the viewing angle limiting optical film 300, the anti-peeping effect of the display device 21 may be further improved. For example, in the present embodiment, the viewing angle limiting optical film 300 includes a second phase retardation film 310 and a third polarizer 320. The second phase retardation film 310 is disposed between the third polarizer 320 and the first polarizer 221 of the display panel 200. The second phase retardation film 310 is, for example, an O-plate, a C-plate, or a B-plate (biaxial plate), but is not limited thereto. Moreover, by providing the reflective polarizer 350 between the viewing angle limiting optical film 300 and the backlight module 100C, the light energy utilization rate of the light source 120 may be increased, thereby increasing the overall brightness value of the backlight module 100C.

However, the invention is not limited thereto, and in other embodiments, the third polarizer 320 of the viewing angle limiting optical film 300 may be a reflective polarizer. Therefore, the display device does not need to be additionally provided with the reflective polarizer 350.

Based on the above, in the display device of an embodiment of the invention, a phase retardation film is provided between the two polarizers of the display panel, and the axial direction of the absorption axis of the polarizer located between the liquid crystal cell and the first optical film is perpendicular to the axial direction of the optical axis of the phase retardation film. Accordingly, the display device may be provided with an anti-peeping effect from an omnidirectional side viewing angle. Moreover, the comprehensive phase retardation film may prevent the display device from generating moiré and effectively improve the light energy utilization rate of the display device in the normal viewing angle range.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, wherein the display device comprises a backlight module and a display panel, wherein the backlight module comprises a light guide plate, a light source, and a first optical film, the light guide plate has a light incident surface and a light exit surface connected to the light incident surface;

the light source is disposed at one side of the light incident surface of the light guide plate; and the first optical film is overlapped with the light exit surface of the light guide plate, and has a plurality of first optical microstructures facing the light exit surface; and the display panel comprises a liquid crystal cell, a first polarizer, a second polarizer, and a first phase retardation film, the liquid crystal cell is overlapped with the light exit surface of the light guide plate;

the first polarizer and the second polarizer are respectively disposed at two opposite sides of the liquid crystal cell, and the first polarizer is located between the liquid crystal cell and the first optical film; and the first phase retardation film is disposed between the first polarizer and the second polarizer, wherein an axial direction of an optical axis of the first phase retardation film is perpendicular to an axial direction of an absorption axis of the first polarizer, and the first phase retardation film is directly adjacent to the liquid crystal cell, wherein the liquid crystal cell is an in-plane switching liquid crystal cell or a vertical alignment liquid crystal cell, and the first phase retardation film is an O-plate.

2. The display device of claim 1, wherein an in-plane phase retardation value of the first phase retardation film is between 100 nm and 300 nm.

3. The display device of claim 1, wherein an average included angle between the axial direction of the optical axis of the first phase retardation film and a thickness direction of the first phase retardation film is in a range of 30 degrees to 75 degrees.

4. The display device of claim 1, wherein the backlight module further comprises:

a low-reflectivity reflector disposed at one side of a bottom surface of the light guide plate, and the bottom surface is disposed opposite to the light exit surface and connected to the light incident surface, wherein an extending direction of the plurality of first optical microstructures is parallel to the light incident surface of the light guide plate.

5. The display device of claim 4, wherein the low-reflectivity reflector is a combination of a specular reflector and a polarizing film, the polarizing film is located between the specular reflector and the light guide plate, and an axial direction of an absorption axis of the polarizing film is parallel to the axial direction of the absorption axis of the first polarizer.

6. The display device of claim 4, wherein the low-reflectivity reflector is a combination of a specular reflector and a plurality of light absorption patterns, and the plurality of light absorption patterns are dispersed on a surface of the specular reflector facing the light guide plate.

7. The display device of claim 4, wherein the backlight module further comprises:
a second optical film disposed between the light guide plate and the low-reflectivity reflector and having a plurality of second optical microstructures, wherein an included angle between an extending direction of the plurality of second optical microstructures and the light incident surface of the light guide plate is between 75 degrees and 105 degrees.

8. The display device of claim 7, wherein the extending direction of the plurality of second optical microstructures is perpendicular to the extending direction of the plurality of first optical microstructures.

9. The display device of claim 1, wherein the backlight module further comprises:
a low-reflectivity reflector disposed at one side of a bottom surface of the light guide plate, and the bottom surface is disposed opposite to the light exit surface and connected to the light incident surface, wherein an included angle between an extending direction of the plurality of first optical microstructures and the light incident surface of the light guide plate is between 75 degrees and 90 degrees.

10. The display device of claim 9, wherein the backlight module further comprises a first prism sheet, a second prism sheet, and a diffusion sheet, wherein
the first prism sheet and the second prism sheet are overlapped with the light exit surface of the light guide plate and located between the first optical film and the first polarizer, and an extending direction of a plurality of prism structures of the first prism sheet is intersected with an extending direction of a plurality of prism structures of the second prism sheet; and
the diffusion sheet is disposed between the light guide plate and the first optical film.

11. The display device of claim 10, wherein the display device further comprises:
a viewing angle limiting optical film overlapped with the display panel and located between the display panel and the backlight module, and the viewing angle limiting optical film comprises a second phase retardation film and a third polarizer, wherein the second phase retardation film is disposed between the third polarizer and the first polarizer.

12. The display device of claim 11, wherein the third polarizer is a reflective polarizer.

13. The display device of claim 11, wherein the display device further comprises:
a reflective polarizer disposed between the viewing angle limiting optical film and the backlight module.

14. The display device of claim 1, wherein the backlight module further comprises a light absorption sheet and a second optical film, wherein
the light absorption sheet is disposed at one side of a bottom surface of the light guide plate, and the bottom surface is disposed opposite to the light exit surface and connected to the light incident surface; and
the second optical film is disposed between the light guide plate and the light absorption sheet, and has a plurality of second optical microstructures, wherein an included angle between an extending direction of the plurality of second optical microstructures and the light incident surface of the light guide plate is between 75 degrees and 105 degrees.

15. A display device, wherein the display device comprises a backlight module and a display panel, wherein
the backlight module comprises a light guide plate, a light source, and a first optical film,
the light guide plate has a light incident surface and a light exit surface connected to the light incident surface;
the light source is disposed at one side of the light incident surface of the light guide plate; and
the first optical film is overlapped with the light exit surface of the light guide plate, and has a plurality of first optical microstructures facing the light exit surface; and
the display panel comprises a liquid crystal cell, a first polarizer, a second polarizer, and a first phase retardation film,
the liquid crystal cell is overlapped with the light exit surface of the light guide plate;
the first polarizer and the second polarizer are respectively disposed at two opposite sides of the liquid crystal cell, and the first polarizer is located between the liquid crystal cell and the first optical film; and
the first phase retardation film is disposed between the first polarizer and the second polarizer, wherein an axial direction of an optical axis of the first phase retardation film is perpendicular to an axial direction of an absorption axis of the first polarizer, and the first phase retardation film is directly adjacent to the liquid crystal cell,
wherein the liquid crystal cell is a twisted nematic liquid crystal cell, and the first phase retardation film is a positive C-plate.

16. The display device of claim 15, wherein a thickness direction phase retardation value of the first phase retardation film is between −100 nm and −300 nm.

* * * * *